United States Patent
Hu

(10) Patent No.: US 9,715,879 B2
(45) Date of Patent: Jul. 25, 2017

(54) COMPUTER IMPLEMENTED METHODS AND APPARATUS FOR SELECTIVELY INTERACTING WITH A SERVER TO BUILD A LOCAL DATABASE FOR SPEECH RECOGNITION AT A DEVICE

(71) Applicant: salesforce.com, inc., San Francisco, CA (US)

(72) Inventor: Minzhi Hu, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 491 days.

(21) Appl. No.: 13/933,463

(22) Filed: Jul. 2, 2013

(65) Prior Publication Data

US 2014/0006028 A1 Jan. 2, 2014

Related U.S. Application Data

(60) Provisional application No. 61/667,014, filed on Jul. 2, 2012.

(51) Int. Cl.
*G10L 15/30* (2013.01)
*G10L 15/10* (2006.01)
*G10L 17/04* (2013.01)
*G10L 15/22* (2006.01)

(52) U.S. Cl.
CPC .............. *G10L 17/04* (2013.01); *G10L 15/30* (2013.01); *G10L 15/10* (2013.01); *G10L 2015/223* (2013.01)

(58) Field of Classification Search
CPC ....... G10L 2015/0635; G10L 2015/223; G10L 15/30; G10L 15/10

USPC ...................... 704/244, 270.1, 271, 235, 236
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Martin Lerner
(74) *Attorney, Agent, or Firm* — Weaver Austin Villeneuve & Sampson LLP

(57) ABSTRACT

Disclosed are methods, apparatus, systems, and computer-readable storage media for selectively interacting with a server to build a local dictation database for speech recognition at a device. In some implementations, a computing device receives an audio sample. The computing device may determine that the received audio sample does not match any of one or more existing audio samples stored in the local dictation database of the computing device. The received audio sample may be transmitted to a remote server for detection of one or more words indicated by the received audio sample. The computing device may receive data identifying the one or more words, and update the local dictation database to store the received audio sample in association with the one or more words.

16 Claims, 9 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,559 B1 * | 5/2001 | Balakrishnan | G06F 3/16 704/270.1 |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,487,534 B1 * | 11/2002 | Thelen | G10L 15/26 704/270 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,181,395 B1 * | 2/2007 | Deligne | G10L 15/065 704/231 |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,396,710 B2 * | 3/2013 | White | G10L 15/30 704/244 |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,949,124 B1 * | 2/2015 | Wooters | G10L 15/065 704/235 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0105639 A1 * | 6/2003 | Naimpally | G10L 13/00 704/276 |
| 2003/0120486 A1 * | 6/2003 | Brittan | G10L 15/32 704/231 |
| 2003/0120493 A1 * | 6/2003 | Gupta | G10L 15/063 704/270.1 |
| 2003/0120675 A1 | 6/2003 | Stauber et al. | |
| 2003/0151633 A1 | 8/2003 | George et al. | |
| 2003/0154078 A1 * | 8/2003 | Rees | G10L 15/10 704/240 |
| 2003/0159136 A1 | 8/2003 | Huang et al. | |

(56) References Cited

U.S. PATENT DOCUMENTS

| | | | |
|---|---|---|---|
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0254787 A1* | 12/2004 | Shah | G10L 15/30 704/219 |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0085186 A1* | 4/2006 | Ma | G10L 15/063 704/240 |
| 2006/0173683 A1* | 8/2006 | Roth | G10L 15/183 704/251 |
| 2007/0239454 A1* | 10/2007 | Paek | G10L 15/19 704/257 |
| 2007/0255569 A1* | 11/2007 | Baker | G09B 21/001 704/270 |
| 2008/0059195 A1* | 3/2008 | Brown | 704/270 |
| 2008/0103779 A1* | 5/2008 | Huang | G10L 15/28 704/275 |
| 2008/0189115 A1* | 8/2008 | Mayer-Ullmann | G06F 9/4443 704/275 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0171669 A1* | 7/2009 | Engelsma | G10L 15/22 704/275 |
| 2009/0177744 A1 | 7/2009 | Marlow et al. | |
| 2010/0057450 A1* | 3/2010 | Koll | G10L 15/32 704/231 |
| 2010/0250250 A1* | 9/2010 | Wiggs | G10L 15/32 704/235 |
| 2011/0184740 A1* | 7/2011 | Gruenstein | G10L 15/32 704/275 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0078635 A1* | 3/2012 | Rothkopf | G10L 15/30 704/270.1 |
| 2012/0173238 A1* | 7/2012 | Mickelsen | G10L 15/30 704/246 |
| 2012/0233137 A1 | 9/2012 | Jakobson et al. | |
| 2012/0265536 A1* | 10/2012 | Paik | G10L 15/22 704/270 |
| 2012/0290407 A1 | 11/2012 | Hubbard et al. | |
| 2013/0073294 A1* | 3/2013 | Burns | G10L 15/22 704/275 |
| 2013/0132089 A1* | 5/2013 | Fanty | G10L 15/30 704/270 |
| 2013/0151250 A1* | 6/2013 | Vanblon | G10L 15/32 704/235 |
| 2013/0191126 A1* | 7/2013 | Thambiratnam | G10L 15/187 704/245 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0297318 A1* | 11/2013 | Balasubramanyam | G06F 3/167 704/275 |
| 2014/0200894 A1* | 7/2014 | Osowski | G10L 13/08 704/260 |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |
| 2016/0071518 A1* | 3/2016 | Schalk | G10L 15/22 704/270.1 |

* cited by examiner

| Audio Sample (710) | Voice Command Text (720) | Application (730) |
|---|---|---|
| Sample001.wav | "open Chatter" | Chatter |
| Sample005.wav | "composer" | Chatter |
| Audio004.wav | "attach" | Chatter |
| Sample211.wav | "open Chatter" | Chatter |
| Audio314.wav | "close application" | (none) |
| Audio132.wav | "dictation" | (none) |
| Sample009.wav | "reload page" | Chrome |
| Sample002.wav | "open tab" | Chrome |

COMPUTER IMPLEMENTED METHODS AND APPARATUS FOR SELECTIVELY INTERACTING WITH A SERVER TO BUILD A LOCAL DATABASE FOR SPEECH RECOGNITION AT A DEVICE

PRIORITY AND RELATED APPLICATION DATA

This application claims priority to U.S. Provisional Patent Application No. 61/667,014, filed on Jul. 2, 2012, entitled SYSTEM AND METHOD FOR EMBEDDED DICTATION, by Hu, which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand database services provided over a data network such as the Internet, and more specifically to database management for speech recognition.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, methods and computer-readable storage media for selectively interacting with a server to build a local dictation database for speech recognition at a device. These drawings in no way limit any changes in form and detail that may be made by one skilled in the art without departing from the spirit and scope of the disclosed implementations.

FIG. 7 depicts an example of a local dictation database with one or more records corresponding to locally recognizable voice commands, in accordance with some implementations.

DETAILED DESCRIPTION

Figure 1A:
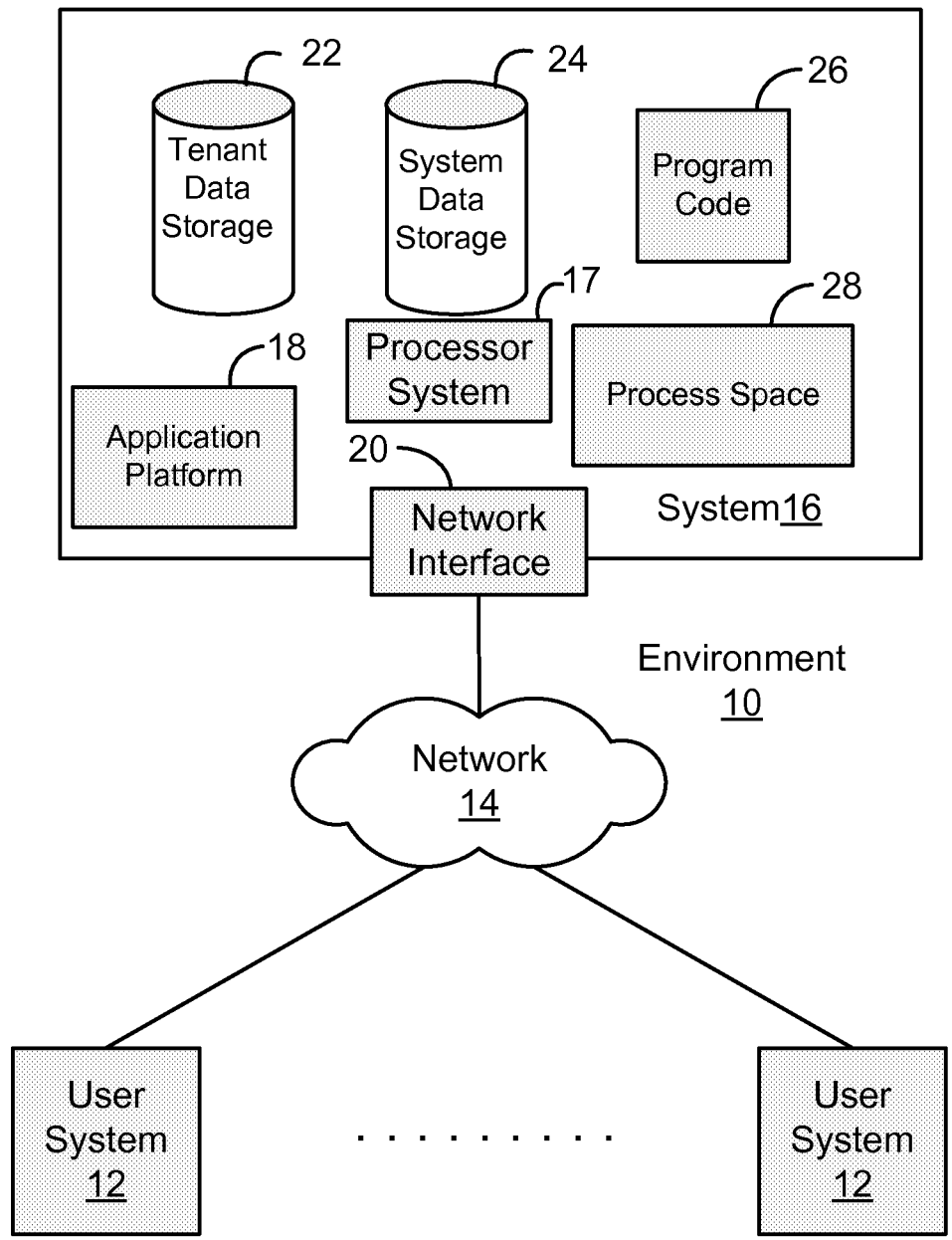
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for selectively interacting with a server to build a local dictation database for local speech recognition at a device. On some mobile devices, a user is able to interact with the device using voice commands. This may be accomplished by communicatively connecting the mobile device to a remote server that performs the task of translating the verbal input. In some situations, however, if the mobile device loses its connection with the remote server, the dictation functionality is also lost. Various implementations described herein allow a mobile device to maintain dictation functionality for a subset of terms regardless if the device is connected to a remote server.

The implementations described herein may be used in various mobile applications designed for connecting to online social networks or other web services. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, the mobile application may contain a finite set of terms or verbal commands that correspond to specific actions on the online social network. In the example of Chatter®, these verbal commands may include "My Chatter", "To Me", "People", "Group", "Composer", "Attach", "Post", and the like. As such, rather than storing a large vocabulary set of terms on the mobile device running the Chatter® mobile application, the application may be configured to recognize a smaller set of terms that are relevant to the application. This may cause the application's memory footprint to be much smaller than it would be if it was capable of recognizing a large vocabulary of words.

In some implementations, the mobile device may store a number of audio samples, each corresponding to a command that the mobile device is able to recognize without communicating with the remote server. When the mobile device receives an audio command from the user, it may then compare the received audio command with the stored audio samples to determine whether the audio command matches any of the stored audio samples. In the event that no match is found on the mobile device, the received audio command may then be transmitted to a remote server to determine what the audio command is saying. Since translating an audio sample directly into text requires a large amount of processing power, that task may be performed by the remote server. The command text identified by the remote server may then be transmitted back to the computing device, and the received audio command may be stored in the dictation database of the computing device along with the command text identified by the server. In these implementations, the computing device may be configured to compare incoming audio samples from the user with stored audio samples that are stored on the computing device to determine a match, which requires less processing power than translating an audio command into text. In this way, the mobile device may add more command terms to the local dictation database and be able to recognize more terms without accessing the remote server.

In some implementations, the local dictation database may be initialized by determining the commands that an application responds to. A mobile device may accomplish this by accessing the accessibility file of the application, which identifies commands and labels relevant to the application. The mobile device may transmit each of these commands and labels to the remote server and receive audio samples for each of the commands and labels, which are stored in the local dictation database. This allows the mobile device to initialize the local dictation database prior to use by a user. In some implementations, the initialization process may occur when the application containing the dictation functionality is compiled on the mobile device.

In some implementations, the commands that are recognized locally by the mobile device may be associated with a single application, with multiple applications, or with the operating system. What application a command is associated with may also be stored in the local dictation database.

The implementations described herein provide offline dictation functionality to a mobile device for a subset of command terms, and allow for expanding dictation functionality as new terms are received by the mobile device, transmitted to a remote server for translation, and stored in the mobile device for future recognition. These implementations also provide for initializing the local dictation database using accessibility files that may be packaged with the applications running on the mobile device.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
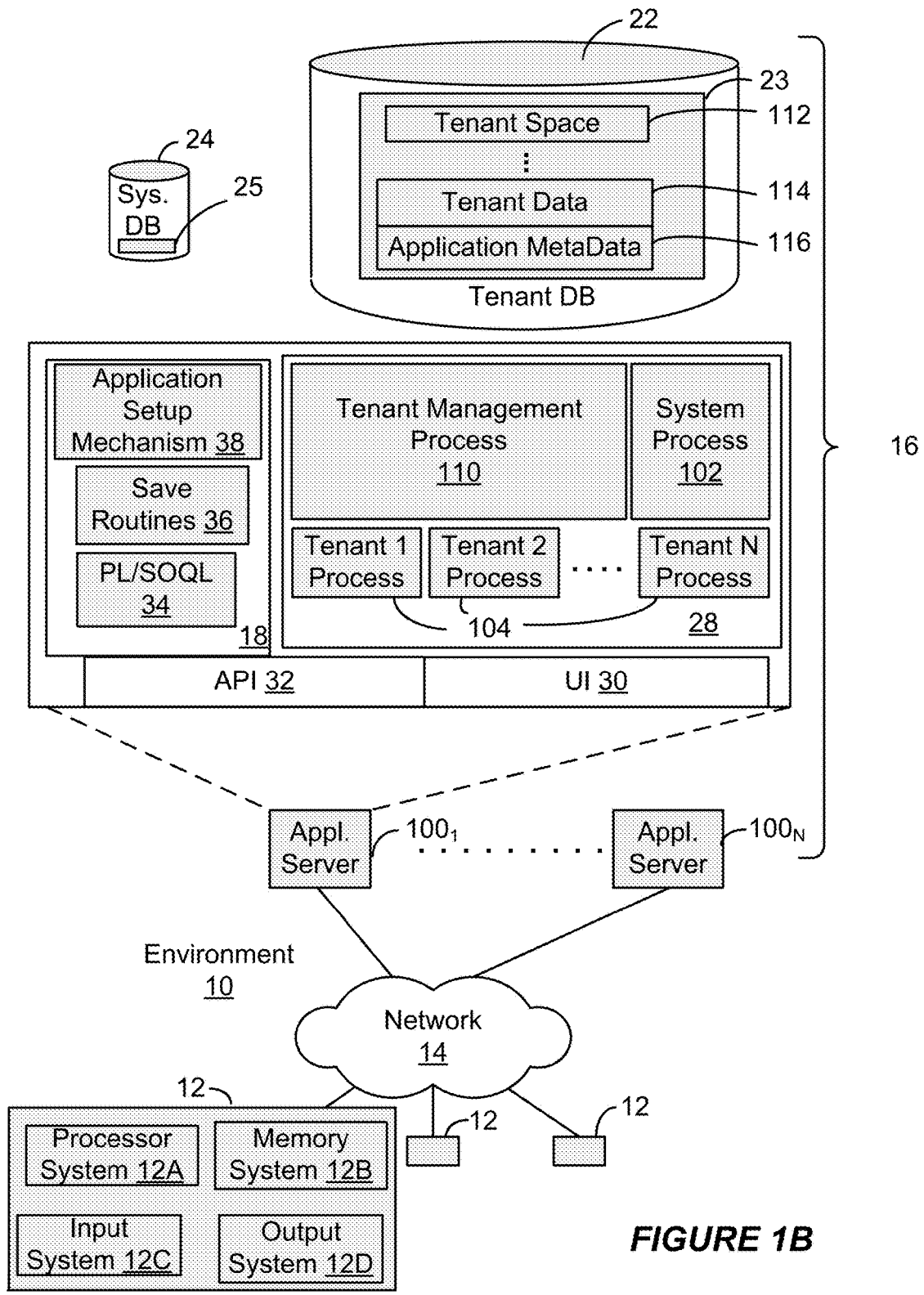
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
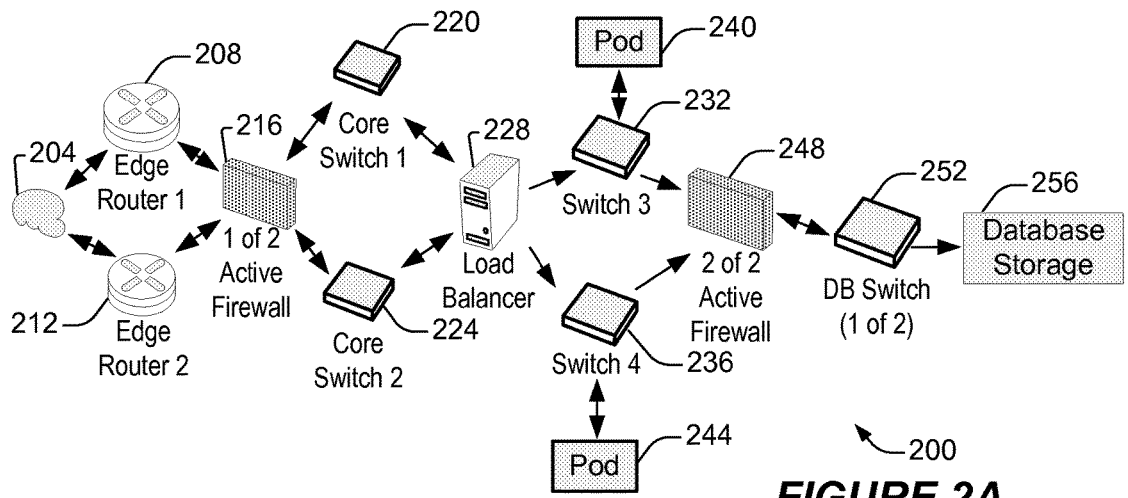
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
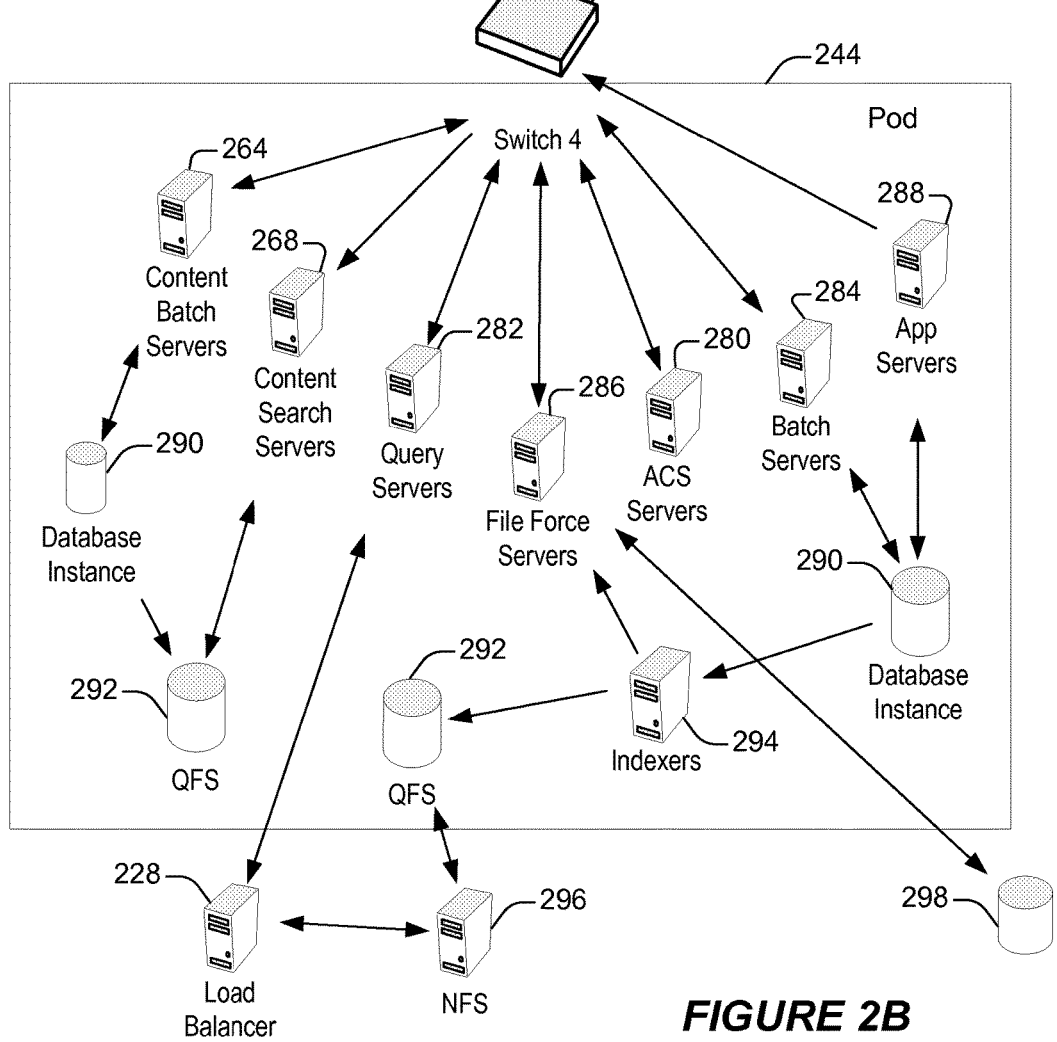
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-10. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 282 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Selectively Interacting with a Server to Build a Local Dictation Database for Speech Recognition at a Device FIG. 3 shows a flowchart of an example of a computer implemented method 300 for selectively interacting with a server to build a local dictation database for speech recognition at a device, in accordance with some implementations.

Figure 3:
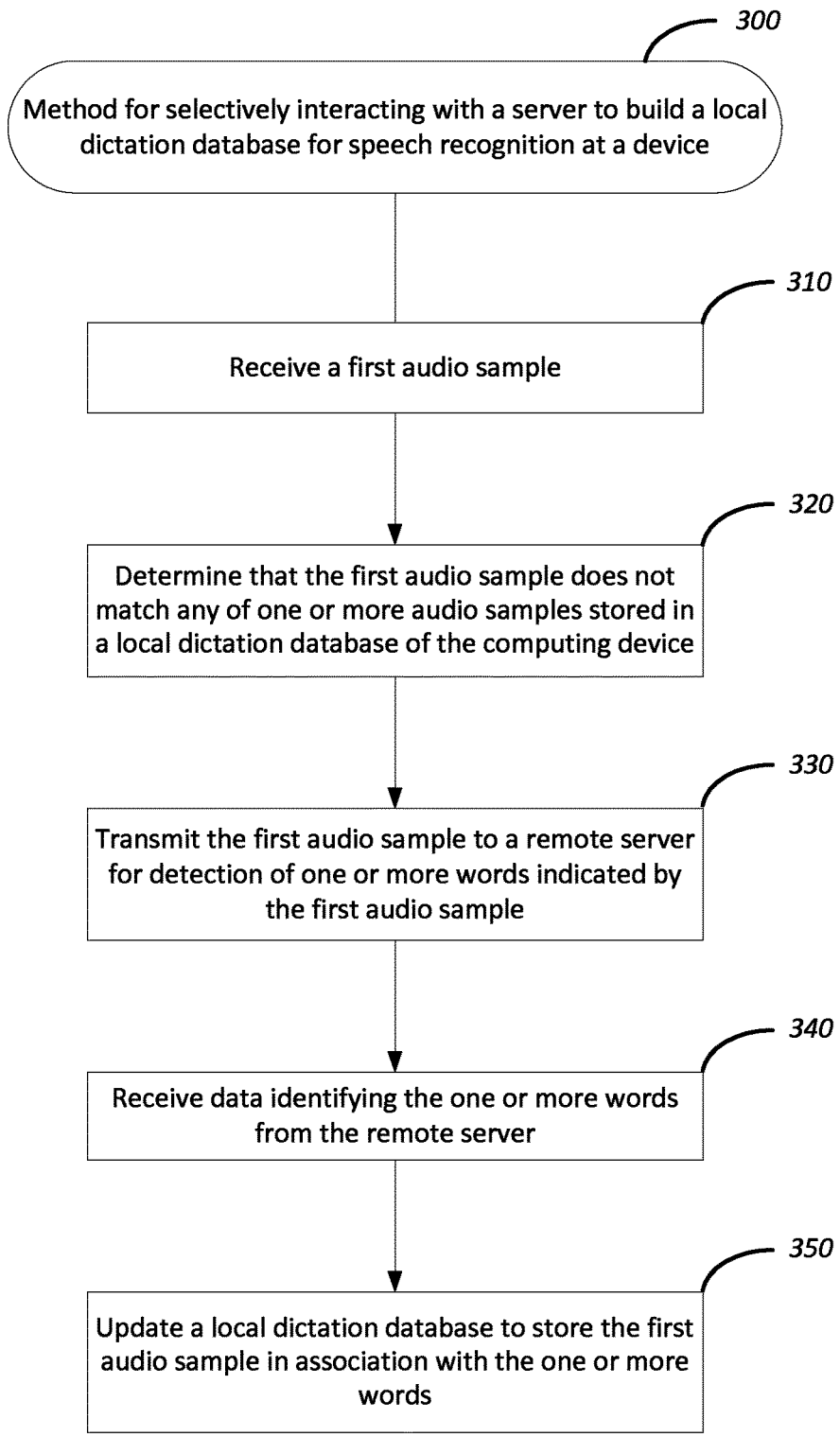
FIG. 3 shows a flowchart of an example of a computer implemented method 300 for selectively interacting with a server to build a local dictation database for speech recognition at a device, in accordance with some implementations.

In FIG. 3, at block 310, a computing device performing method 300 receives a first audio sample. In some implementations, the audio sample that the computing device received may be a voice recording of a user of the computing device. For example, Chatter® is a mobile application capable of executing natively on iOS, Android, and other mobile platforms. The mobile application provides access to a larger Chatter® enterprise social network offered and managed by salesforce.com, inc. A user navigating a Chatter® application on his mobile device and wishing to use a voice command to compose a message may say "open composer." The mobile device may receive the audio recording of the user's command, and trigger the command to open the composer interface to compose a message. In some implementations, the audio sample is received through a built-in microphone of the mobile device. In other implementations, the mobile device may filter out noises from the audio sample prior to comparing the audio sample to other audio samples.

In FIG. 3, at block 320, the computing device performing method 300 determines that the first audio sample does not match any of one or more audio samples stored in a local dictation database of the computing device. The local dictation database of the computing device may store audio samples that correspond to executable actions that may be executed in the operating system or an application of the computing device. In some implementations, the computing device may make this determination using a speech recognition algorithm or application running on the computing device that compares two audio samples to detect a match. In some implementations, when the first audio sample does not match any of the audio samples stored in the local dictation database, it may be that the first audio sample does not contain a recognizable command. Alternatively, the first audio sample may contain a command that the local speech recognition application does not recognize but can be recognized by a remote speech recognition application running on a remote server.

In FIG. 3, at block 330, the computing device performing method 300 transmits the first audio sample to a remote server for detection of one or more words indicated by the first audio sample. In some implementations, the remote server may possess more processing power and more sophisticated speech recognition algorithms than those possessed by the computing device. The first audio sample may be transmitted to the remote server, where a speech recognition application on the remote server may recognize and identify the one or more words that are being spoken in the first audio sample. In the example of the Chatter® mobile application user, the audio sample that was recorded by the mobile device may be transmitted to a salesforce.com, inc.-hosted server, where the audio sample is processed to identify the words that the user spoke.

In FIG. 3, at block 340, the computing device performing method 300 receives data identifying the one or more words from the remote server. The remote server, once it has processed the audio sample and identified the words in the audio sample, transmits the words back to the computing device. In the Chatter® example, the user's mobile device may receive the words "open composer" from the salesforce.com, inc. server.

In FIG. 3, at block 350, the computing device performing method 300 updates a local dictation database to store the first audio sample in association with the one or more words. In some implementations, the local dictation database contains records that associate audio samples with the one or more words that are contained in the audio samples. For example, the voice recording received by the Chatter® user's mobile device may be stored in the local dictation database, along with the words "open composer," to be used for future recognition of voice commands received by the mobile device.

In some implementations, the first audio sample and the one or more words may also be associated in the local dictation database with an application of the mobile device. For example, the voice command "open Chatter" may only be meaningful within the Chatter® mobile application, in which case the first audio sample and the words "open Chatter" may be associated with the Chatter® mobile application in the local dictation database. In other implementations, a voice command, such as "close application" may be applicable to any application running on the mobile device, in which case the audio sample and the one or more words may not be associated with any particular application of the mobile device. In some implementations, the computing device may determine the application to be associated with the first audio sample and the one or more words by identifying the application that was open at the time the first audio sample was received by the computing device. For example, since the Chatter® application was open when the mobile device received the command, the first audio sample and "open Chatter" may be associated with the Chatter® application.

FIG. 7 depicts an example of a local dictation database with one or more records corresponding to locally recognizable voice commands, in accordance with some implementations. The audio sample column 710 of the table stores pointers to the audio files stored on the computing device. The voice command text column 720 stores the text of the command associated with the audio sample. The application column 730 stores the application of the computing device in which the command executed. In some implementations, multiple audio samples may be associated with the same voice command text to provide better recognition of voice commands that may sound different based on the pronunciation. When an audio sample is received at the computing device, it is compared with each of the audio samples in column 710. If a matching record is found, then the corresponding voice command text and application may subsequently be used to determine what action to execute.

Figure 4:
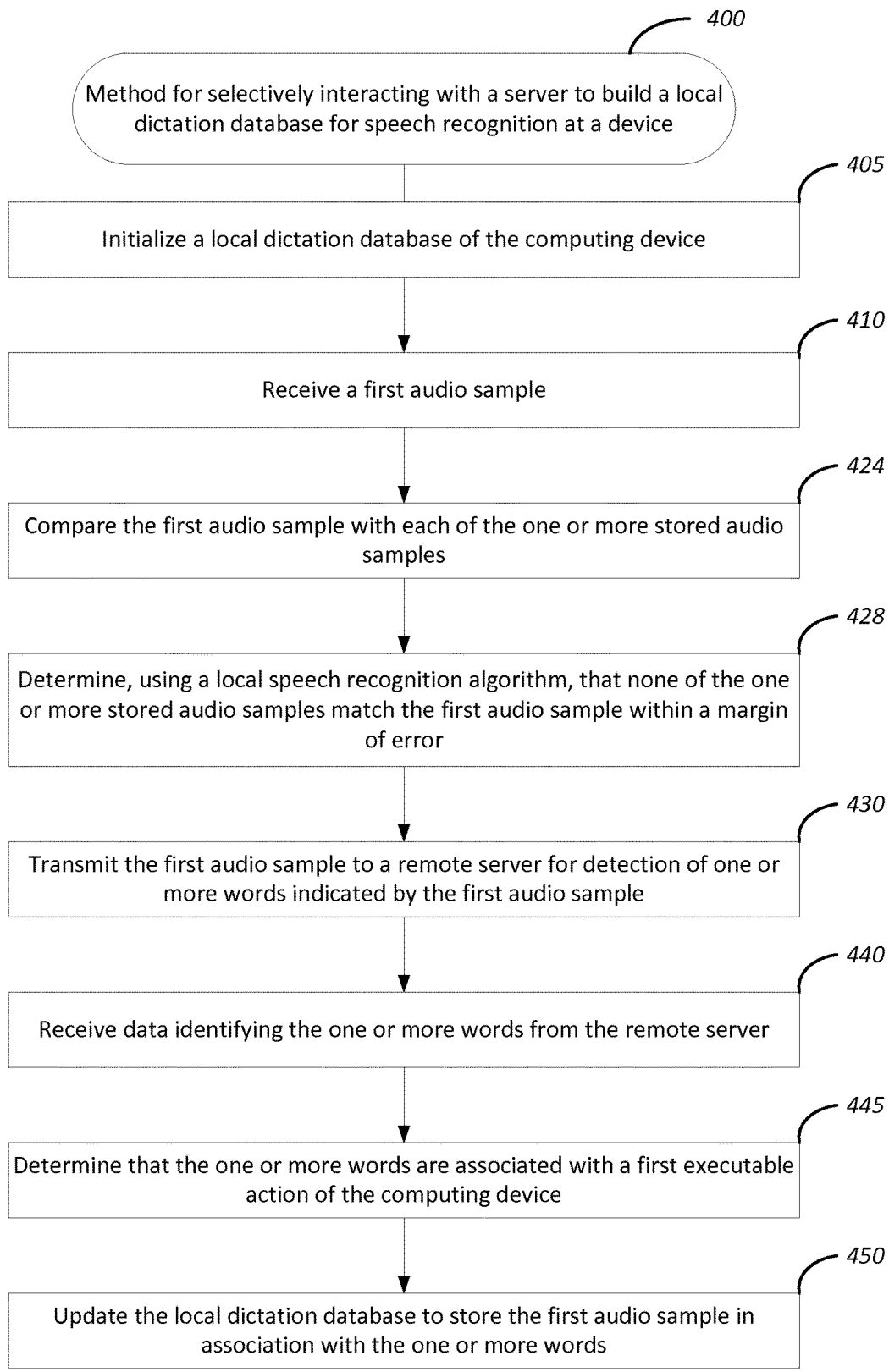
FIG. 4 shows a flowchart of an example of a computer implemented method 400 for selectively interacting with a server to build a local dictation database for speech recognition at a device, in accordance with some implementations.

FIG. 4 shows a flowchart of an example of a computer implemented method 400 for selectively interacting with a server to build a local dictation database for speech recognition at a device, in accordance with some implementations.

In FIG. 4, at block 405, a computing device performing method 400 initializes a local dictation database of the computing device. In some implementations, the local dictation database may be initialized with one or more records containing audio samples and command terms to be used for offline speech recognition, providing the computing device with some offline speech recognition capabilities prior to receiving any voice commands from a user. Details of the initialization process are described below in method 500 of FIG. 5.

In FIG. 4, at block 410, the computing device performing method 400 receives a first audio sample, as generally described above at block 310 of method 300.

In FIG. 4, at block 424, the computing device performing method 400 compares the first audio sample with each of the one or more stored audio samples. As an example, returning to FIG. 7, the computing device may compare the first audio sample with each of the audio samples in column 710 to determine whether there is a match.

In FIG. 4, at block 428, the computing device performing method 400 determines, using a local speech recognition algorithm, that none of the one or more stored audio samples match the first audio sample within a margin of error. Returning to the example of FIG. 7, the computing device may determine that none of the audio samples in column 710 matches the first audio sample closely enough within a predetermined margin of error. In some implementations, a user may specify in a setting on the computing device the margin of error that may be tolerated when matching received audio samples with stored audio samples.

In FIG. 4, at block 430, the computing device performing method 400 transmits the first audio sample to a remote server for detection of one or more words indicated by the first audio sample, as generally described above at block 330 of method 300.

In FIG. 4, at block 440, the computing device performing method 400 receives data identifying the one or more words from the remote server, as generally described above at block 340 of method 300.

In FIG. 4, at block 445, the computing device performing method 400 determines that the one or more words are associated with a first executable action of the computing device.

Figure 8:
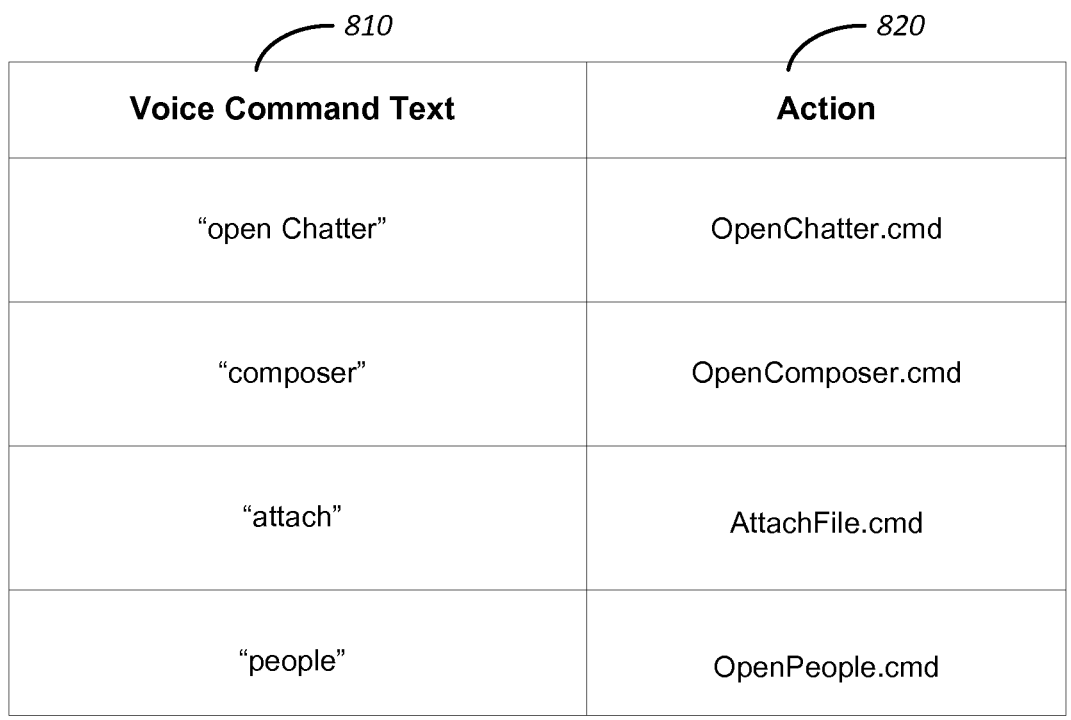
FIG. 8 depicts an example of an application commands file for an application, in accordance with some implementations.

FIG. 8 depicts an example of an application commands file for an application, in accordance with some implementations. In some implementations, an application of mobile device includes executable actions that are associated with command texts. For example, an email application of a mobile device is configured to respond to a command to compose a new message by opening up an interface for composing a new message. Similarly, every application includes a list of executable actions and the corresponding commands that trigger the executable actions. FIG. 8 contains an example of such a list for the Chatter® application. The voice command text column 810 lists the command texts that the application responds to, and the action column 820 lists the executable actions corresponding to each command text.

In some implementations, after the computing device determines the one or more words that are contained in the first audio sample, the computing device then proceeds to determine whether the one or more words correspond to an actual executable action in the application or in the operating system of the computing device.

In some implementations, the computing device may determine that the one or more words do not correspond to any executable action on the computing device, in which case the computing device may display in the user interface an indication that the first audio sample was not recognized.

In other implementations, the computing device may identify an executable action that does correspond to the one or more words of the audio sample. For instance, the one or more words of the audio sample may be determined by the remote server to be "attach," and the Chatter® application may be the application that is currently open on the computing device. The computing device may then search through the table of FIG. 8 to determine whether there is an executable action associated with the command text "attach." The computing device may then identify the AttachFile.cmd command as matching the command text.

In FIG. 4, at block 450, the computing device performing method 400 updates the local dictation database to store the first audio sample in association with the one or more words. In some implementations, this may include creating a record in the table of FIG. 7, including the first audio sample, the one or more words, and the application that is currently open in the computing device.

In some implementations, updating the local dictation database allows the computing device to subsequently be able to recognize and identify an audio sample similar to the first audio sample. For instance, if a record was created in the local dictation database for the command "attach," then the next time the user speaks the word "attach," the computing device may compare that audio sample with the audio sample that was stored in association with the command "attach" and determine that the user spoken command is "attach," obviating another communication with the remote server to determine the one or more words in the new audio sample from the user.

Figure 5:
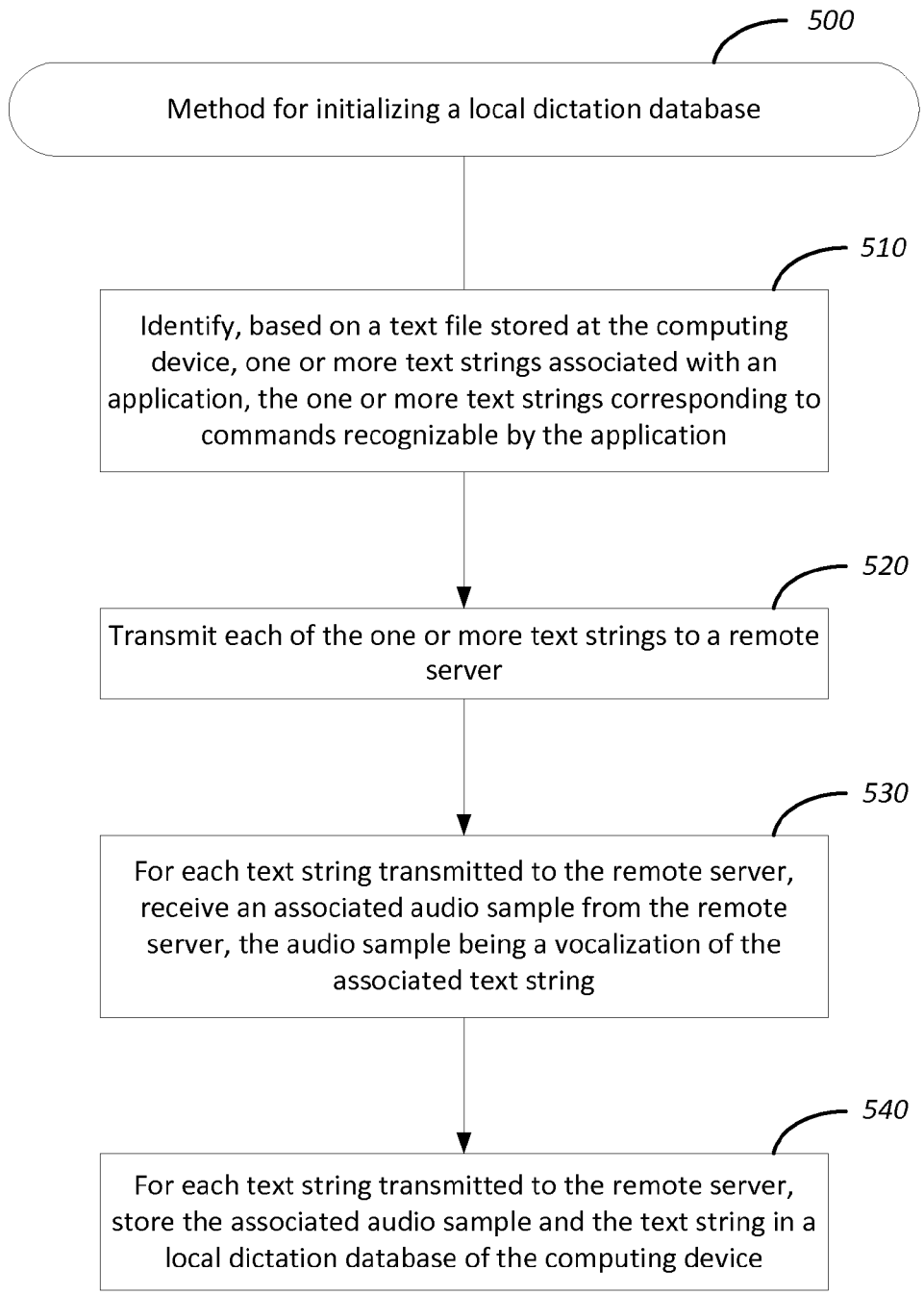
FIG. 5 shows a flowchart of an example of a computer implemented method 500 for initializing a local dictation database, in accordance with some implementations.

FIG. 5 shows a flowchart of an example of a computer implemented method 500 for initializing a local dictation database, in accordance with some implementations.

In FIG. 5, at block 510, a computing device performing method 500 identifies, based on a text file stored at the computing device, one or more text strings associated with an application, the one or more text strings corresponding to commands recognizable by the application.

In some implementations, a mobile device may include an accessibility file that includes accessibility labels for reading displayed text and executable actions to a visually impaired user. An example of this is Apple®'s VoiceOver application, which allows a visually impaired user to use a mobile device by providing read-aloud text that is displayed on the screen and read-aloud commands that the user can select to execute. As part of this accessibility feature, each application may include an accessibility file that includes command texts that correspond to executable actions of the application. As part of the initialization process, the computing device may go through the accessibility file of each application installed on the computing device, and identify all of the command texts that are contained in the accessibility files, each of the command texts associated with an application or with the operating system, and associated with an executable action of the application or operating system.

In FIG. 5, at block 520, the computing device performing method 500 transmits each of the one or more text strings to a remote server. As an example, the Chatter® application of the computing device may include the command texts: "open Chatter," "composer," "attach," and "people." The computing device in the initialization process may identify these four command texts and transmit each of them to the salesforce.com, inc. server. The remote server may receive each command text and return an audio sample corresponding to the command text for the computing device to store for future local speech recognition.

In FIG. 5, at block 530, for each text string transmitted to the remote server, the computing device performing method 500 receives an associated audio sample from the remote server, the audio sample being a vocalization of the associated text string.

In FIG. 5, at block 540, for each text string transmitted to the remote server, the computing device performing method 500 stores the associated audio sample and the text string in a local dictation database of the computing device. The computing device may receive the audio sample from the remote server, and then create a record in the local dictation database containing the received audio sample, the command text that was sent to the remote server, and the application associated with the command text. In this way, prior to receiving any audio samples from the user, the computing device may initialize the local dictation database based on the accessibility files provided by the applications and by the operating system.

In some implementations, this initialization process may be executed by the computing device until all of the audio samples corresponding to each command text stored in each accessibility file has been downloaded from the remote server and stored in the local dictation database. In other implementations, the computing device may limit the number of audio samples that is downloaded from the remote server. The limit may be on a per application basis: that is, each application may download only a predetermined number of audio samples.

Figure 6:
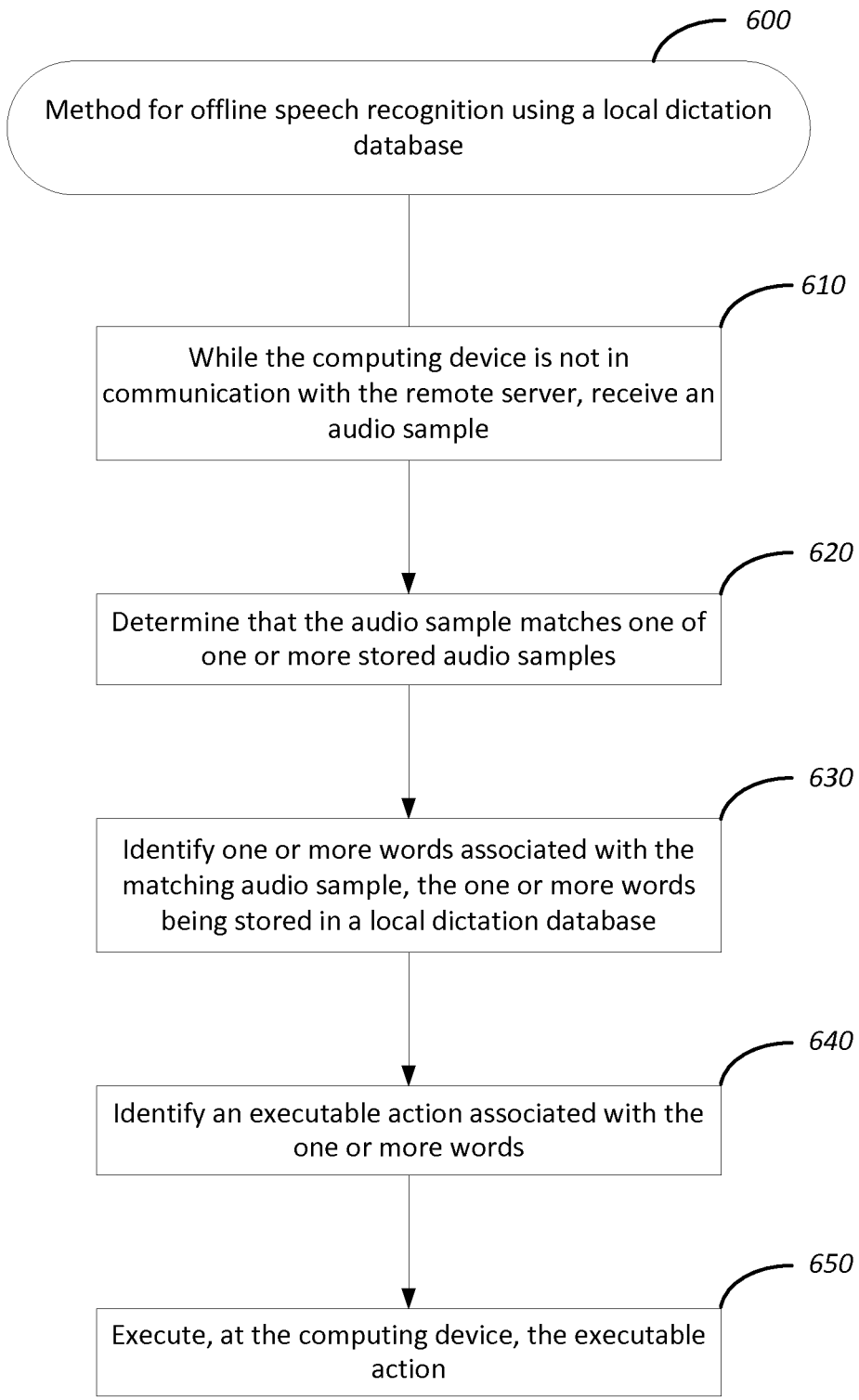
FIG. 6 shows a flowchart of an example of a computer implemented method 600 for offline speech recognition using a local dictation database, in accordance with some implementations.

FIG. 6 shows a flowchart of an example of a computer implemented method 600 for offline speech recognition using a local dictation database, in accordance with some implementations.

In FIG. 6, at block 610, a computing device performing method 600 receives an audio sample while the computing device is not in communication with a remote server, as generally described above at block 310 of method 300.

In FIG. 6, at block 620, the computing device performing method 600 determines that the audio sample matches one of one or more stored audio samples, using the method generally described above at block 320 of method 300.

In FIG. 6, at block 630, the computing device performing method 600 identifies one or more words associated with the matching audio sample, the one or more words being stored in a local dictation database. Once the computing device identifies a stored audio sample that matches the received audio sample, the computing device may then identify the one or more words that are stored in the same record of the local dictation database. Turning to FIG. 7, if the received audio sample matches the "Audio004.wav" audio sample in the table, then the computing device will identify "attach" as the corresponding command text for the received audio sample, and Chatter® as the application with which the audio sample is associated.

In FIG. 6, at block 640, the computing device performing method 600 identifies an executable action associated with the one or more words. Returning to the example in block 630, the computing device may turn to the table of FIG. 8, which corresponds to the Chatter® application, to determine what executable action should be executed in connection with the "attach" command text. The computing device may identify "attach" in the voice command text column 810 and identify AttachFile.cmd as the corresponding executable action.

In FIG. 6, at block 650, the computing device performing method 600 executes the executable action. Returning to the example in block 640, the computing device then directs the Chatter® application to execute the AttachFile.cmd command.

In some implementations, all of the blocks of method 600 may be performed on the computing device without a connection to the remote server, making offline speech recognition possible for the commands that are stored in the local dictation database.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method for selectively interacting with a server to build a local database for speech recognition at a computing device, the method comprising:
    maintaining, at a computing device associated with a user, a local database comprising a plurality of audio samples, each audio sample being identified in association with:
        any one of a plurality of voice command text files, each voice command text file being configured to store a text string of the audio sample, the text string being a transcription of a vocalization in the audio sample,
        any one of a plurality of different applications, the plurality of different applications being executable at the computing device, and
        any one of a plurality of different application command files, each application command file corresponding to a single respective application and associating at least one executable action to be performed within the application with at least one voice command text file;
    receiving, at the computing device, a first audio command;
    determining, using a local speech recognition algorithm at the computing device, that the first audio command does not match any of the plurality of audio samples of the local database within a margin of error;
    transmitting, responsive to the determining step, the first audio command from the computing device to a remote server for detection of one or more voice command text files associated with the first audio command;
    receiving, at the computing device from the remote server, the one or more detected voice command text files associated with the first audio command;
    identifying an application at the computing device in relation to the one or more detected voice command text files, the identifying comprising analyzing a plurality of application command files at the computing device to locate an application command file matching the detected voice command text to the application; and
    updating, at the computing device, the local database to:
        include the first audio command in the plurality of audio samples of the local database,
        associate the first audio command with the identified application, and
        associate the first audio command with an application command file corresponding to the identified application.

2. The method of claim 1, the method further comprising:
    determining that the one or more detected voice command text files are associated with a first executable action of the computing device.

3. The method of claim 2, wherein one or more executable actions of the computing device are defined by and executable by the identified application.

4. The method of claim 2, wherein one or more executable actions of the computing device are defined by an operating system of the computing device, and wherein the executable actions are executable by one or more applications installed on the computing device.

5. The method of claim 2, the method further comprising:
    while the computing device is not in communication with the remote server, receiving, at the computing device, a second audio command;
    determining that the second audio command matches one of the plurality of audio samples of the local database;
    identifying one or more voice command text files associated with the second audio command, the one or more identified voice command text files being stored in the local database;
    identifying a second executable action associated with the one or more identified voice command text files; and
    executing, at the computing device, the second executable action.

6. The method of claim 2, wherein a plurality of executable actions are stored on the computing device, each executable action including an action text describing the executable action, and wherein the identifying an application at the computing device in relation to the one or more detected voice command text files comprises:
    identifying a group of executable actions that a currently open application of the computing device is capable of executing; and
    determining that the action text of a first executable action matches the one or more detected voice command text files.

7. The method of claim 1, the method further comprising:
    determining that the one or more detected voice command text files are not associated with an executable action of the computing device; and
    displaying, in a user interface of a display at the computing device, an indication that the first audio command was not recognized.

8. The method of claim 1, the method further comprising:
    initializing the local database of the computing device.

9. The method of claim 1, wherein each of the plurality of different application command files includes one or more accessibility labels for providing accessibility services to the visually impaired.

10. The method of claim 1, the method further comprising:
    determining that the one or more detected voice command text files is stored in the local database in association with a second audio command, such that the first audio command and the second audio command are associated with the one or more detected voice command text files.

11. The method of claim 1, wherein the first audio command includes an audio recording of a voice command from the user.

12. A non-transitory computer-readable storage medium storing program code executable by one or more processors for selectively interacting with a server to build a local database for speech recognition at a device, the program code comprising instructions configured to cause:
 maintaining, at a computing device associated with a user, a local database comprising a plurality of audio samples, each audio sample being identified in association with:
  any one of a plurality of voice command text files, each voice command text file being configured to store a text string of the audio sample, the text string being a transcription of a vocalization in the audio sample,
  any one of a plurality of different applications, the plurality of different applications being executable at the computing device, and
  any one of a plurality of different application command files, each application command file corresponding to a single respective application and associating at least one executable action to be performed within the application with at least one voice command text file;
 receiving, at the computing device, a first audio command;
 determining, using a local speech recognition algorithm at the computing device, that the first audio command does not match any of the plurality of audio samples of the local database within a margin of error;
 transmitting, responsive to the determining step, the first audio command from the computing device to a remote server for detection of one or more voice command text files associated with the first audio command;
 receiving, at the computing device from the remote server, the one or more detected voice command text files associated with the first audio command;
 identifying an application at the computing device in relation to the one or more detected voice command text files, the identifying comprising analyzing a plurality of application command files at the computing device to locate an application command file matching the detected voice command text to the application; and
 updating, at the computing device, the local database to:
  include the first audio command in the plurality of audio samples of the local database,
  associate the first audio command with the identified application, and
  associate the first audio command with an application command file corresponding to the identified application.

13. The non-transitory computer-readable storage medium of claim 12, the instructions further configured to cause:
 determining that the one or more detected voice command text files are associated with a first executable action of the computing device.

14. The non-transitory computer-readable storage medium of claim 13, the instructions further configured to cause:
 while the computing device is not in communication with the remote server, receiving, at the computing device, a second audio command;
 determining that the second audio command matches one of the plurality of audio samples of the local database;
 identifying one or more voice command text files associated with the second audio command, the one or more identified voice command text files being stored in the local database;
 identifying a second executable action associated with the one or more identified voice command text files; and
 executing, at the computing device, the second executable action.

15. One or more computing devices for selectively interacting with a server to build a local database for speech recognition at a device, the one or more computing devices comprising:
 one or more processors configured to cause:
  maintaining, at a computing device associated with a user, a local database comprising a plurality of audio samples, each audio sample being identified in association with:
   any one of a plurality of voice command text files, each voice command text file being configured to store a text string of the audio sample, the text string being a transcription of a vocalization in the audio sample,
   any one of a plurality of different applications, the plurality of different applications being executable at the computing device, and
   any one of a plurality of different application command files, each application command file corresponding to a single respective application and associating at least one executable action to be performed within the application with at least one voice command text file;
  receiving, at the computing device, a first audio command;
  determining, using a local speech recognition algorithm at the computing device, that the first audio command does not match any of the plurality of audio samples of the local database within a margin of error;
  transmitting, responsive to the determining step, the first audio command from the computing device to a remote server for detection of one or more voice command text files associated with the first audio command;
  receiving, at the computing device from the remote server, the one or more detected voice command text files associated with the first audio command;
  identifying an application at the computing device in relation to the one or more detected voice command text files, the identifying comprising analyzing a plurality of application command files at the computing device to locate an application command file matching the detected voice command text to the application; and
  updating, at the computing device, the local database to:
   include the first audio command in the plurality of audio samples of the local database,
   associate the first audio command with the identified application, and
   associate the first audio command with an application command file corresponding to the identified application.

16. The one or more computing devices of claim 15, the one or more processors further configured to cause:
 while the computing device is not in communication with the remote server, receiving, at the computing device, a second audio command;

determining that the second audio command matches one of the plurality of audio samples of the local database;

identifying one or more voice command text files associated with the second audio command, the one or more identified voice command text files being stored in the local database;

identifying a second executable action associated with the one or more identified voice command text files; and executing, at the computing device, the second executable action.

* * * * *